US004001665B2

United States Statutory Invention Registration [19]

[11] Reg. Number: H1665

Brumbaugh

[45] Published: Jul. 1, 1997

[54] LIQUID DISHWASHING DETERGENT

[76] Inventor: Ernest H. Brumbaugh, 11029 Crooked Lake Dr., NE., Rockford, Mich. 49341

[21] Appl. No.: 618,345

[22] Filed: Mar. 19, 1996

Related U.S. Application Data

[63] Continuation of Ser. No. 353,091, Dec. 9, 1994, abandoned.

[51] Int. Cl.[6] ..... C11D 1/06

[52] U.S. Cl. ..... 510/218; 510/235; 510/237; 510/426; 510/427; 510/428; 510/429

[58] Field of Search ..... 510/218, 235, 510/237, 426, 427, 428, 429

[56] References Cited

U.S. PATENT DOCUMENTS

| | | | |
|---|---|---|---|
| H1467 | 8/1995 | Prieto et al. | 252/99 |
| 4,052,342 | 10/1977 | Fernley et al. | 252/541 |
| 4,079,020 | 3/1978 | Mills et al. | 252/547 |
| 4,102,826 | 7/1978 | Renaud | 252/548 |
| 4,235,752 | 11/1980 | Rosall et al. | 252/551 |
| 4,248,729 | 2/1981 | Rubingh et al. | 252/174.22 |
| 4,457,856 | 7/1984 | Mitchell et al. | 252/166 |
| 4,492,646 | 1/1985 | Welch | 252/528 |
| 4,857,213 | 8/1989 | Caswell et al. | 252/8.75 |
| 5,389,277 | 2/1995 | Prieto | 252/99 |
| 5,427,717 | 6/1995 | Schisla et al. | 252/549 |

FOREIGN PATENT DOCUMENTS 0836774 6/1960 United Kingdom .

*Primary Examiner*—Charles T. Jordan
*Assistant Examiner*—Meena Chelliah
*Attorney, Agent, or Firm*—Willian Brinks Hofer Gilson & Lione

[57] ABSTRACT

A liquid dishwashing detergent having improved sudsing and cleaning properties includes the combination of selected secondary alkyl sulfates with alkyl ether sulfates. The secondary alkyl sulfates selected from the group consisting of $C_{14}$ or $C_{16}$ secondary alkyl sulfates and their salts with the secondary alkyl sulfates being substantially free from other carbon length secondary alkyl sulfates.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIQUID DISHWASHING DETERGENT

This application is a continuation of application Ser. No. 08/353,091, filed Dec. 9, 1994, abandoned.

BACKGROUND OF THE INVENTION

The present invention relates to detergent compositions useful for dishwashing.

The invention also relates to a method of washing dishes using such detergent compositions and to specific secondary alkyl sulfates in combination with ether sulfates suitable for use in such detergent compositions.

The term "dishes" as used in the following description indicates utensils that maybe required to be washed free from food particles and other food residues, greases, proteins, starches, gums, dyes, oil, and burnt organic residues.

Liquid dishwashing compositions for use in manual dishwashing are well-known and have met with a high degree of acceptance by consumers primarily because of their good washing and foaming properties and convenient form for use.

Most of the formulations in commercial use at the present time are based on synthetic organic detergents that, together with supplementary materials often used, give them satisfactory detergency and foaming properties. Historically, the main synthetic organic detergent used in such compositions has been formed from alkyl benzene sulfonates. Research, however, continues in an effort to provide alternatives to alkyl benzene sulfonates that are more environmentally acceptable. One such solution has been the development of secondary alkyl sulfates. Secondary alkyl sulfates are generally prepared from straight chain $C_{10}$–$C_{18}$ alpha olefins or internal olefins and, depending on the reaction conditions during sulfonation, it is possible to produce $C_{10}$–$C_{18}$ secondary alkyl sulfates having the sulfate group predominantly in the 2- or 3-position of the alkyl chain, or $C_{10}$–$C_{18}$ secondary alkyl sulfates having the sulfate group more randomly distributed on the alkyl chain. During such preparation, the secondary alkyl sulfates produced have a mixture of carbon chain lengths.

As noted in U.S. Pat. No. 4,235,752, however, the performance of such secondary alkyl sulfates is poor compared to the wellknown alkyl benzene sulfonates. U.S. Pat. No. 4,235,752 therefore teaches that a small group of secondary alkyl sulfate "isomers" are particularly useful in detergent compositions. In particular, the $C_{14}^{-2}$, $C_{15}^{-2/3/4/5/6}$, $C_{16}^{-3/4/5/6/7}$, and $C_{17}^{-7/8/9}$ secondary alkyl sulfates are described as being useful where the suffix number indicates the carbon atom number on the alkyl chain on which the sulfate group is attached.

A particular problem with generally available detergents exists when the water used for washing is soft (i.e., has a hardness level less than 25 ppm as $CaCO_3$). As used in the following specification and claims, the hardness level is expressed in ppm as $CaCO_3$. At these low water hardness levels, the stability of the foam can be inadequate. Another problem with generally available detergents exists when the water used for washing has a hardness level greater than about 300 ppm (as $CaCO_3$). At a high hardness level the amount of foam produced and the performance of the detergent is reduced. Consequently, a need exists for a dishwashing detergent that provides good foam stability over a wide range of water hardness levels.

Unexpectedly, it has been found that an improved dishwashing composition can be formulated by using a combination of specific secondary alkyl sulfates with an ether sulfate, where the secondary alkyl sulfate is selected from the group consisting of $C_{14}$ or $C_{16}$ secondary alkyl sulfates and their salts and where the secondary alkyl sulfate is substantially free from other carbon lengths. The combination, in a range of ratios of the specific secondary alkyl sulfate to the ether sulfate, provides improved washing performance over a range of water hardness levels as compared to what would be expected based on the performance of either the alkyl sulfate or the ether sulfate alone.

SUMMARY OF THE INVENTION

The present invention relates to a dishwashing detergent composition comprising the combination of a secondary alkyl sulfate with an ether sulfate. The secondary alkyl sulfate is selected from the group consisting of $C_{14}$ or $C_{16}$ secondary alkyl sulfates and their salts wherein the secondary alkyl sulfate is substantially free from other carbon atom length secondary alkyl sulfates. In this context "substantially free" means less than 8% of other carbon atom lengths. For example, a $C_{14}$ secondary alkyl sulfate contains at least 95% of $C_{14}$ with no more than 2% of $C_{12}$ and no more than 4% of $C_{16}$. A $C_{16}$ secondary alkyl sulfate contains at least 92% of $C_{16}$ with no more than 5% of $C_{14}$ and no more than 5% of $C_{18}$.

The ether sulfate has the general formula $RO(C_2H_4O)_xSO_3M$ wherein R is alkyl or alkenyl having from about 10 to about 20 carbon atoms, x is from 1 to 30, and M is a water soluble cation. Preferably, R is alkyl having from about 12 to about 15 carbon atoms, x is from 1 to about 3 more preferably about 3 and M is sodium.

The combination of the alkyl sulfate with ether sulfate can be incorporated into a dishwashing composition at a level from about 2 to about 70, preferably from about 10 to about 50 percent by weight of the composition. The ratio of alkyl sulfate to ether sulfate ranges from about 1:19 to about 9:1.

In one preferred embodiment, the secondary alkyl sulfate is a $C_{14}$ secondary alkyl sulfate with the ratio of the secondary alkyl sulfate to ether sulfate in the range from about 1:19 to about 9:1.

In another preferred embodiment, the secondary alkyl sulfate is a $C_{16}$ secondary alkyl sulfate with the radio of the secondary alkyl sulfate to ether sulfate is in the range from about 1:19 to about 9:1.

The detergent composition may also contain other surfactants so long as they do not detract from the improved detergency obtained from the combination of the secondary alkyl sulfate with the ether sulfate. Known adjuvants and additives such as perfumes, fragrances, and the like may also be present at nominal levels with an aggregate of less than about 1 percent by weight of the composition. Water may comprise the balance.

DETAILED DESCRIPTION OF THE INVENTION AND PREFERRED EMBODIMENTS

The present invention is an aqueous composition that includes from about 2% to about 70% of the combination of a specific secondary alkyl sulfate with an ether sulfate. The composition may further include additional surfactants and adjuvants so long as they do not detract from the improved performance realized by the combination of the specific secondary alkyl sulfate with ether sulfates.

Specific examples of the secondary alkyl sulfates that can be used in the detergent compositions of the present invention include secondary alkyl sulfates and the salts where the alkyl group contains from 12 to 18 carbon atoms such that the alkyl portion has a single carbon chain length substantially free from other carbon chain lengths. The alkali metal, magnesium, and alkaline earth metal secondary alkyl sulfates are preferred with the secondary alkyl sulfates selected from the group consisting of $C_{14}$ or $C_{16}$. $C_{14}$ and $C_{16}$ sodium secondary alkyl sulfates manufactured and sold by Shell Chemical Co. under the name DAN 214 and DAN 216, respectively, are most preferred.

The ether sulfates useful in the present invention are those having the formula $RO(C_2H_4O)_xSO_3M$ wherein R is alkyl or alkenyl having from about 10 to about 20 carbon atoms, x is 1 to 30, and M is a watersoluble cation preferably sodium. The ether sulfates useful in the present invention are condensation products of ethylene oxide and monohydric alcohols having from about 10 to about 20 carbon atoms. Preferably, R has 10 to 16 carbon atoms. The alcohols can be derived from natural fats, e.g., coconut oil or tallow, or can be synthetic. Such alcohols are reacted with 1 to 30, and especially 1 to 12, molar proportions of ethylene oxide and the resulting mixture of molecular species is sulfated and neutralized.

Preferred alkyl ether sulfates are those having an average alkyl chain length of from about 10 to about 15 carbon atoms and an average degree of ethoxylation of from about 1 to about 12 moles of ethylene oxide. The more preferred alkyl ether sulfates are those having an average alkyl chain length of from about 12 to about 15 carbon atoms and an average degree of ethoxylation of about 3 moles of ethylene oxide.

Optional Surfactants

The compositions of the invention may also contain optional surfactants such as cationic, anionic, nonionic, ampholytic, and zwittefionic surfactants so long as they do not deter from the performance obtained by the combination of the alkyl sulfate with alkyl ether sulfate. Such surfactants are known to those skilled in the art and many are set forth in McCutcheon's Emulsifiers & Detergents (1992) which is incorporated herein by reference.

Examples of anionic surfactants that may be useful in the present invention are those compounds which contain two anionic functional groups. These are referred to as di-anionic surfactants. Suitable di-anionic surfactants are the disulfonates, disulfates, or mixtures thereof which may be represented by the following formula:

$$R(SO_3)_2M_2, R(SO_4)_2M_2, R(SO_3)(SO_4)M_2$$

where R is an acyclic aliphatic hydrocarbyl group having 15 to 20 carbon atoms and M is a water-solubilizing cation, for example, the $C_{15}$ to $C_{20}$ dipotassium-1,2-alkyldisulfonates or disulfates, disodium 1,9-hexadecyl disulfates, $C_{15}$ to $C_{20}$ disodium 1,2-alkyldisulfonates, disodium 1,9-stearyldisulfates and 6,10-octadecyldisulfates.

Other anionic surfactants may also be useful. For example, the following anionic surfactants and mixtures thereof may be useful in the present invention: alkyl benzene sulfonates, alkyl sulfates, paraffin sulfonates, alkyl glyceryl ether sulfonates, alpha olefin sulfonates, sulfosuccinates mono and diesters, sarcosinates, alkyl taurates, and fatty alcohol carboxylates.

Nonionic Surfactant

Nonionic surfactants that may be useful in the present invention include ethoxylated fatty acids, alcohol ethoxylates, block copolymers, alkoxylated fatty alcohols, alkanolamides, amine oxides, and mixtures thereof. Generally, but not exclusively, the nonionic surfactants that may be used in the instant compositions are of three basic types—the ethylene oxide condensates, the amides, and the amine oxide semi-polar nonionics.

The ethylene oxide condensates are broadly defined as compounds produced by the condensation of ethylene oxide groups (hydrophilic in nature) with an organic hydrophobic compound, which can be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

Examples of such ethylene oxide condensates include:

(1) The condensation products of aliphatic alcohols with ethylene oxide. The alkyl chain of the aliphatic alcohol can either be straight or branched and generally contains from about 10 to about 14 carbon atoms for best performance as a suds stabilizer. Examples of such ethoxylated alcohols include the condensation product of about 6 moles of ethylene oxide with 1 mole of tridecanol, myristyl alcohol condensed with about 10 moles of ethylene oxide per mole of myristyl alcohol, the condensation product of ethylene oxide with coconut fatty alcohol wherein the coconut alcohol is a mixture of fatty with alkyl chains varying from 10 to 14 carbon atoms and wherein the condensate contains about 6 moles of ethylene oxide per mole of alcohol, and the condensation product of about 9 moles of ethylene oxide with the above-described coconut alcohol. An example of a commercially available nonionic surfactant of this type includes Neodol 23-6.5 marketed by the Shell Chemical Company.

(2) The ethylene oxide condensates of alkyl phenols. These compounds include the condensation products of alkyl phenols having an alkyl group containing from about 6 to 12 carbon atoms in either a straight chain or branches chain configuration, with ethylene oxide, the ethylene oxide being present in amounts equal to 5 to 25 moles of ethylene oxide per mole of alkyl phenol. The alkyl substituent in such compounds can be derived, for example, from polymerized propylene, diisobutylene, octene, or nonene. Examples of compounds of this type include nonyl phenol condensed with about 9.5 moles of ethylene oxide per mole of nonyl phenol, dodecyl phenol condensed with about 12 moles of ethylene oxide per mole of phenol, dinonyl phenol condensed with about 15 moles of ethylene oxide per mole of phenol, diisooctylphenol condensed with about 15 moles of ethylene oxide per mole of phenol. Commercially available nonionic surfactants of this type include Igepal CO-610 marketed by the GAF Corporation; and Triton X-45, X-114, X-100 and X-102, all marketed by the Rohm and Haas Company. These ethylene oxide condensates may be useful in improving rinse water drainage characteristics.

Other ethoxylated nonionic surfactants can provide the drainage promoting characteristics of the above ethylene oxide condensates, but are less desirable for reasons of biodegradability and effect on sudsing or cleaning performance. Examples of such alternate ethoxylated nonionic surfactants are:

(1) the condensation product of mono $C_{16-22}$ fatty acid esters of polyglycols with from about 13 to about 100 moles of ethylene oxide per mole of partial ester;

(2) the condensation product of cholesterol and from about 13 to about 100 moles of ethylene oxide; and (3) a material which is a condensate of ethylene oxide, propylene oxide and a compound containing hydroxy or amine groups onto which the alkylene oxides can be polymerized, said polymer having a molecular weight of from about 500 to about 15,000, an ethylene oxide content of from about 30% to about 70% by weight and a propylene oxide content of from about 30% to about 70% by weight.

Instead of ethylene oxide, the above condensation products may use propylene oxide.

Examples of the amide type of nonionic surface active agent include the ammonia, monoethanol, diethanol, and isopropanol amides of fatty acids having an acyl moiety of from about 8 to about 18 carbon atoms. These acyl moieties may be derived from fatty acids and methyl esters of those acids from naturally occurring glycerides, e.g., coconut oil, palm oil, soybean oil and tallow, but can be derived synthetically, e.g., by the oxidation of petroleum, or by hydrogenation of carbon monoxide by the Fischer-Tropsch process. The monoethanol amides and diethanolamides of $C_{12-14}$ fatty acids are preferred.

Amine oxide semi-polar nonionic surface active agents comprise compounds and mixtures of compounds having the formula:

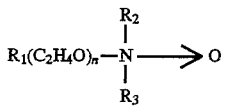

wherein $R_1$ is an alkyl, 2-hydroxyalkyl, 3-hydroxyalkyl, or 3-alkoxy-2-hydroxypropyl radical in which the alkyl and alkoxy, respectively, contain from about 8 to about 18 carbon atoms, $R_2$ and $R_3$ are methyl, ethyl, propyl, isopropyl, 2-hydroxyethyl, 2-hydroxypropyl, or 3-hydroxypropyl and n is from 0 to about 10. Particularly preferred are amine oxides of the formula:

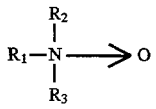

wherein $R_1$ is a $C_{1-14}$ alkyl, alkyl amido alkyl or cocamido propyl and $R_2$ and $R_3$ are methyl or ethyl. Non-limiting examples include alkylamidoalkyl amine oxides such as cocamidopropyl amine oxide.

Other Surfactants

Ampholytic surfactants that may be used herein can be broadly described as derivatives of aliphatic amines which contain a long chain of about 8 to 18 carbon atoms and an anionic water-solubilizing group, e.g. carboxy, sulfo, or sulfate. Examples of compounds falling within this definition are sodium-3-dodecylamino propane sulfonate, and dodecyl dimethylammonium hexanoate.

Amphoteric surfactants may also be useful in the present composition and may include the alkyl mono and diacetates, alkyl and alkyl amino proprionates and carboxyproprionates, alkyl and hydroxyalkyl glycinates, alkyl carboxy glycinates, sulfoamphoterics, alkyl betaines, alkyl amido betaines, alkyl and alkyl amido hydroxysulfaines, and mixtures thereof.

Zwittefionic surface active agents that may be operable in the instant composition are broadly described as internally-neutralized derivatives of aliphatic quaternary ammonium and phosphonium and tertiary sulfonium compounds in which the aliphatic radical can be straight chain or branched, and wherein one of the aliphatic substituents contains from about 8 to 18 carbon atoms and one contains an anionic water solubilizing group, e.g., carboxy, sulfo, sulfato, phosphato, or phosphono.

Cationic surfactants such as quaternary ammonium compounds may find optional use in the practice of the invention to the extent they are compatible with the other surfactants in the particular composition.

Optional Ingredients

The detergent compositions of this invention can contain, if desired, any of the usual adjuvants, diluents and additives, for example, perfumes, enzymes, dyes, antitarnishing agents, antimicrobial agents, and the like, without extracting from the advantageous properties of the compositions. Alkalinity sources and pH buffering agents such as alkali metal carbonates and bicarbonates, monoethanolamine, triethanolamine and alkali metal hydroxides can also be utilized.

An abrasive agent may be included including any of the water-insoluble abrasive materials known in the art which have a particle diameter of from about 5 to about 250, preferably from about 20 to about 125, microns and a hardness on the Mohs scale of from about 2 to about 8, preferable from about 4 to about 7. Included are materials such as agate, mica, calcite, garnet, quartz, kieselguhr, silica, marble, tripoli, flint, feldspar, emery, pumice, alumina, perlite, expanded perlite, volcanic ash, diatomaceous earth, bentonite, amorphous silica from dehydrated silica gels, precipitated silica, plastics such as polystyrene and polyacrylates, and natural and synthetic aluminosilicates and mixtures thereof.

Suspending or thickening agents may also be useful in the compositions of this invention disclosed in U.S. Pat. No. 3,393,153, incorporated herein by reference, including colloidal silica having a mean particle diameter ranging from about 0.01 micron to about 0.05 micron, colloidal clays such as bentonites or chemically treated bentonites, isomorphous silicates especially those with a high magnesium content, particulate polymers such as polystyrene, oxidized polystyrene having an acid number of from 20 to about 40, sulfonated polystyrene having an acid number of from about 10 to about 30, polyethylene, oxidized polyethylene having an acid number of from about 10 to about 30; sulfonated polyethylene having an acid number of from about 5 to about 25; polypropylene, oxidized polypropylene having an acid number of from about 10 to about 30 and sulfonated polypropylene having an acid number of from about 5 to about 25, all of said particulate polymers having mean particle diameters ranging from about 0.01 micron to about 30 microns. Other examples of suspending an thickening agents include copolymers of styrene with monomers such as maleic anhydride, nitrilonitrile, methacrylic acid and lower alkyl esters of methacrylic acid, copolymers of styrene with methyl or ethyl acrylate, methyl or ethyl maleate, vinyl acetate, acrylic, maleic or fumaric acids and mixtures thereof. The mole ratio of ester and/or acid to styrene is preferably in the range from about 4 to about 40 styrene units per ester and/or acid unit. Such materials preferably have a mean particle diameter range of from about 0.05 micron to about 1 micron and molecular weights ranging from about 500,000 to about 2,000,000. Cellulosic polymers such as carboxymethyl cellulose and hydroxypropyl cellulose and gums such as guar gum and gum tragacanth are also suitable suspending and thickening agents.

Colloidal clays are especially preferred suspending and thickening agents and provide particularly stable compositions when produce pH is maintained or adjusted to range of from about 8.0 to about 10.0, preferably from about 8.0 to about 9.0. An alkaline pH value has an additional benefit as an aid to cleaning, particularly when the product is used undiluted for scouring purposes.

Alcohols, such as ethyl alcohol, glycols, such as propylene, butylene and hexylene glycol, and hydrotropes, such as sodium and potassium toluene sulfonate, sodium and potassium xylene sulfonate, trisodium sulfosuccinate and related compounds (as disclosed in U.S. Pat. No. 3,915,903, incorporated herein by reference) and urea, can be utilized in the interests of achieving a desired product phase stability, viscosity, and yield value.

The liquid detergent compositions of the present invention may have a liquid base component that functions as a carrier and diluent of the other detergent components. The liquid base is preferably water or other polar solvent, or mixtures thereof. Exemplary nonlimiting polar solvents, in addition to water, include low molecular weight primary and secondary monohydric alcohols such as methanol, ethanol, isopropanol, and polyols containing from about 2 to about 6 carbon hydroxy groups such as propylene glycol, ethylene glycol, glycerine, and 1,3-propanediol. Typically, the liquid detergent composition will contain between about 10% and about 80% of the liquid base, and preferably will contain between about 20% and about 70% water.

The present composition is typically made by mixing the various components in the aqueous or liquid base, preferably .with stirring at an elevated temperature, e.g., 40° to 50° C., for a short period of time, e.g., five minutes. After manufacture, the product may be bottled, packed, cooled, stored and shipped for use.

The improved liquid dishwashing detergent may be used in a manner similar to that used with other such products now on the market. The difference is in the results obtained rather than in the method of use. The concentration of the liquid detergent in wash water will be from about 0.01 to about 10% by weight, preferably from about 0.05% to about 0.5% by weight. In use, the detergent is added to the water and the dishes are washed with it. The pH of the wash water will normally be from 4 to 10, preferably from 6 to 8. During the period of washing, which may take from one minute to one-half hour, a stable copious foam of desirable consistency and appearance is obtained and the dishes washed are clean.

In miniplate dishwashing tests, which duplicate or simulate actual wash conditions. It is found that the foaming ability of the present compositions and their washing power (number of plates washed before foam disappears) are superior to those of the individual components. Such a discovery was unpredictable.

In the "miniplate" test of such materials, small plates having a standard amount of a standard grease coating applied to the plates are washed in warm water, e.g., at 50° C. at the beginning of the test, at different hardnesses and the numbers of plates washed until the foam disappears are counted. The sudsing characteristic of the compositions of the invention is that necessary to provide the user of the product with an indication of cleaning potential in a dishwashing solution. Solids encountered in dishwashing act as suds depressants and the presence or absence of suds from the surface of a dishwashing solution is a convenient guide to product usage.

Several miniplate tests were conducted to determine the effectiveness of the combination of the present invention. In a first test, the ratio of the combination of sodium $C_{14}$ secondary alkyl sulfate to a sodium $C_{12-15}$ alkyl ether sulfate (ethoxylated with about 3 moles of ethylene oxide) was varied and compared to the results obtained when only the alkyl sulfate and only the ether sulfate were used. The water had a water hardness of 15 ppm and Crisco Soil was used. The ratio of the secondary alkyl sulfate to ether sulfate in the range of about 1:19 to about 9:1 exhibited improved performance as compared to what would have been expected based on the performance exhibited where only the secondary alkyl sulfate or only the ether sulfate was used.

In a second test, the ratio of the combination of sodium $C_{14}$ secondary alkyl sulfate to a sodium $C_{12-15}$ alkyl ether sulfate (ethoxylated with about 3 moles of ethylene oxide) was varied and compared to the results obtained when only the secondary alkyl sulfate and only the ether sulfate were used. The water had a water hardness of 150 ppm and Crisco Soil was used. The ratio of the secondary alkyl sulfate to ether sulfate at about 2:8 exhibited improved performance as compared to what would have been expected based on the performance exhibited where only the secondary alkyl sulfate or only the ether sulfate was used.

In a third test, the ratio of the combination of sodium $C_{14}$ secondary alkyl sulfate to a sodium $C_{12-15}$ alkyl ether sulfate (ethoxylated with about 3 moles of ethylene oxide) was varied and compared to the results obtained when only the secondary alkyl sulfate and only the ether sulfate were used. The water had a water hardness of 450 ppm and Crisco Soil was used. The ratio of the secondary alkyl sulfate to ether sulfate in the range from about 1:19 to about 7:3 exhibited improved performance as compared to what would have been expected based on the performance exhibited where only the secondary alkyl sulfate or only the ether sulfate was used.

Three miniplate tests were conducted using the $C_{16}$ secondary alkyl sulfate in combination with the sodium alkyl ether sulfate of the present invention. In the first test, the ratio of sodium $C_{16}$ secondary alkyl sulfate to a sodium $C_{12-15}$ alkyl ether sulfate (ethoxylated with about 3 moles of ethylene oxide) was varied and compared to the results obtained when only the alkyl sulfate and only the ether sulfate were used. The water had a water hardness of 15 ppm and Crisco Soil was used. The ratio of the secondary alkyl sulfate to ether sulfate in the range of about 1:19 to about 9:1 exhibited improved performance as compared to what would have been expected based on the performance exhibited where only the secondary alkyl sulfate or only the ether sulfate was used.

In the second test, the ratio of sodium $C_{16}$ secondary alkyl sulfate to a sodium $C_{12-15}$ alkyl ether sulfate (ethoxylated with about 3 moles of ethylene oxide) was varied and compared to the results obtained when only the secondary alkyl sulfate and only the ether sulfate were used. The water had a water hardness of 150 ppm and Crisco Soil was used. At all ratios of the secondary alkyl sulfate to ether sulfate the performance was not significantly different as compared to what would have been expected based on the performance exhibited where only the secondary alkyl sulfate or only the ether sulfate was used.

In the third test, the ratio of sodium $C_{16}$ secondary alkyl sulfate to a sodium $C_{12-15}$ alkyl ether sulfate (ethoxylated with about 3 moles of ethylene oxide) was varied and compared to the results obtained when only the secondary alkyl sulfate and only the ether sulfate were used. The water had a water hardness of 450 ppm and Crisco Soil was used. The ratio of the secondary alkyl sulfate to ether sulfate at about 2:8 and in the range from about 1:1 to about 9:1 exhibited improved performance as compared to what would have been expected based on the performance exhibited where only the secondary alkyl sulfate or only the ether sulfate was used.

Of course it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A liquid dishwashing detergent composition comprising, per 100 parts by weight:

a. 2 to 70 parts by weight of the combination of a secondary alkyl sulfate selected from the group consisting of $C_{14}$ or $C_{16}$ secondary alkyl sulfates and their salts with the secondary alkyl sulfates being substantially free from other carbon length secondary alkyl sulfates with an ether sulfate having the formula $RO(C_2H_4O)_xSO_3M$ wherein R is alkyl or alkenyl of about 10 to about 20 carbon atoms, x is from 1 to 30, and M is a water soluble cation;

b. 0 to 20 parts of additives; and, c. water comprising the balance.

2. The dishwashing detergent composition of claim 1 wherein the ratio of secondary alkyl sulfate to ether sulfate ranges from about 1:19 to about 9:1.

3. The dishwashing detergent composition of claim 1 wherein the ratio of secondary alkyl sulfate to ether sulfate ranges from about 1:4 to about 4:1.

4. The dishwashing detergent composition of claim 1 wherein the secondary alkyl sulfate is a $C_{14}$ sodium secondary alkyl sulfate substantially free from other carbon length secondary alkyl sulfates.

5. The dishwashing detergent composition of claim 1 wherein the secondary alkyl sulfate is a $C_{16}$ sodium secondary alkyl sulfate substantially free from other carbon length secondary alkyl sulfates.

6. The dishwashing detergent composition of claim 1 wherein the ether sulfate has the formula $RO(C_2H_4O)_xSO_3M$ wherein R is alkyl or alkenyl and has from about 12 to about 15 carbon atoms x is about 3, and M is sodium.

7. The dishwashing detergent composition of claim 3 wherein the ratio of the secondary alkyl sulfate to the ether sulfate ranges from about 1:19 to about 9:1.

8. The dishwashing detergent composition of claim 4 wherein the ratio of the secondary alkyl sulfate to the ether sulfate ranges from about 1:19 to about 9:1.

9. The liquid dishwashing detergent of claim 1 further containing at least one surfactant selected from the group consisting of cationic, anionic, and nonionic surfactants and mixtures thereof.

* * * * *